United States Patent
Littlejohn

(10) Patent No.: US 9,958,963 B2
(45) Date of Patent: May 1, 2018

(54) SYSTEMS, METHODS, AND APPARATUSES FOR CREATING DIGITAL GLITTER WITH ACCELEROMETER

(71) Applicant: American Greetings Corporation, Cleveland, OH (US)

(72) Inventor: Randall Dillion Littlejohn, Brooklyn, OH (US)

(73) Assignee: American Greetings Corporation, Westlake, OH (US)

( * ) Notice: Subject to any disclaimer, the term of this patent is extended or adjusted under 35 U.S.C. 154(b) by 35 days.

(21) Appl. No.: 14/626,244

(22) Filed: Feb. 19, 2015

(65) Prior Publication Data
US 2015/0234480 A1   Aug. 20, 2015

Related U.S. Application Data

(60) Provisional application No. 61/941,605, filed on Feb. 19, 2014.

(51) Int. Cl.
| | |
|---|---|
| *G06T 13/00* | (2011.01) |
| *G06T 15/50* | (2011.01) |
| *G06F 3/0346* | (2013.01) |
| *G06T 11/00* | (2006.01) |

(52) U.S. Cl.
CPC .......... *G06F 3/0346* (2013.01); *G06T 11/001* (2013.01); *G09G 2320/0686* (2013.01); *G09G 2340/10* (2013.01); *G09G 2340/14* (2013.01); *G09G 2354/00* (2013.01); *G09G 2380/14* (2013.01)

(58) Field of Classification Search
None
See application file for complete search history.

(56) References Cited

U.S. PATENT DOCUMENTS

| | | | |
|---|---|---|---|
| 6,043,821 A | 3/2000 | Sprague et al. | |
| 7,379,566 B2 * | 5/2008 | Hildreth ............... | G06F 1/1686 348/208.1 |
| 8,847,878 B2 * | 9/2014 | Kerr ....................... | G09G 5/36 345/156 |
| 9,513,706 B2 * | 12/2016 | Cruz-Hernandez ..... | G06F 3/016 |
| 2002/0187285 A1 | 12/2002 | Michell et al. | |
| 2006/0017692 A1 * | 1/2006 | Wehrenberg .......... | G06F 1/1616 345/156 |
| 2006/0274070 A1 * | 12/2006 | Herman .................. | A63F 13/10 345/474 |
| 2009/0021513 A1 | 1/2009 | Joshi et al. | |
| 2009/0186702 A1 * | 7/2009 | Denk, Jr. ............... | G06Q 90/00 463/42 |
| 2010/0175287 A1 * | 7/2010 | Gupta ................... | B42D 15/022 40/124.01 |

(Continued)

*Primary Examiner* — Andrew G Yang
(74) *Attorney, Agent, or Firm* — Calfee, Halter & Griswold, LLP

(57) ABSTRACT

Methods and systems for rendering an electronic greeting card to a portable computing device, wherein the visually-perceived light effects of the electronic greeting card are updated in real time. The electronic greeting card is dynamically rendered to the portable computing device including these dynamic light effects. An accelerometer is used to generate an input signal capable of initiating an algorithm that generates the dynamic light effects.

13 Claims, 5 Drawing Sheets

FIGURE 2

(56) References Cited

U.S. PATENT DOCUMENTS

| | | | |
|---|---|---|---|
| 2011/0007076 A1* | 1/2011 | Nielsen | G06F 17/30241 |
| | | | 345/441 |
| 2012/0011450 A1 | 1/2012 | To | |
| 2012/0036433 A1 | 2/2012 | Zimmer et al. | |
| 2012/0036745 A1* | 2/2012 | Chen | B42D 15/027 |
| | | | 40/124.01 |
| 2012/0276880 A1* | 11/2012 | Angorn | H04W 4/12 |
| | | | 455/414.1 |
| 2013/0042509 A1 | 2/2013 | Hawkins et al. | |
| 2013/0080866 A1 | 3/2013 | Ogilvie et al. | |
| 2013/0086516 A1* | 4/2013 | Rodgers | G06T 13/80 |
| | | | 715/799 |
| 2014/0337800 A1* | 11/2014 | Gray | G06F 3/0482 |
| | | | 715/835 |
| 2015/0058775 A1* | 2/2015 | Krebs | G06F 3/0484 |
| | | | 715/771 |

* cited by examiner

SYSTEMS, METHODS, AND APPARATUSES FOR CREATING DIGITAL GLITTER WITH ACCELEROMETER

RELATED APPLICATIONS

This non-provisional utility patent application claims priority to and the benefits of U.S. Provisional Patent Application Ser. No. 61/941,605, filed on Feb. 19, 2014, and entitled SYSTEMS, METHODS, AND APPARATUSES FOR CREATING DIGITAL GLITTER WITH ACCELEROMETER, which application is incorporated herein by reference in its entirety.

FIELD OF THE INVENTION

The general inventive concepts relate to creating digital graphics, more particularly, to systems, methods, and apparatuses for creating digital glitter for an electronic greeting card or any other electronic display or image with input from an accelerometer.

BACKGROUND

Digital graphics have been increasingly popular in the modern technology era. With the speed of computing and processing rising exponentially over time, software and hardware developers have been quick to adopt the change to bring high quality digital graphics to consumers.

However, with a multitude of available hardware and software configurations, and with a variety of available application program interfaces, it has been difficult for graphics developers to create digital models that rendered consistently across the several platforms. This problem is accentuated with the widespread adoption of portable computing devices and the plethora of computing choices that these devices bring to the developers.

Paper greeting cards have been popular in the human culture for many decades, perhaps even centuries. The steady development in printing technology also allowed for the paper greeting cards to utilize high quality graphics properties. For example, it is popular to have glitter, foil, and embossing finishes on paper greeting cards. However, it has proven very difficult to reproduce these same physical glitter-like or shimmering finishes in a digital greeting card medium, especially in light of the wide variety of hardware and software platforms available in today's technology market.

Additionally, until now, manipulations of digital graphics have been largely limited to being carried out via software implementations. Portable computing in the modern technology era also provides for portable hardware components, which may be utilized in conjunction with software implementations to impact the creation and rendering of digital graphics.

BRIEF SUMMARY

The general inventive concepts contemplate systems, methods, and apparatuses for creating digital glitter in electronic images with input from an accelerometer. By way of example, to illustrate various aspects of the general inventive concepts, several exemplary embodiments of systems, methods, and/or apparatuses are disclosed herein.

According to an aspect of the invention, a system for rendering an electronic greeting card includes a portable computing device having a memory, wherein the memory includes data representing a pre-existing energy value, and an accelerometer that generates an output related to movement of the portable computing device. The pre-existing energy value is based upon the output of the accelerometer and an algorithm updates the visually-perceived light effects of the electronic greeting card in real time based on the pre-existing energy value. The electronic greeting card is dynamically rendered to the portable computing device.

According to another aspect of the invention, a method for rendering an electronic greeting card to a portable computing device having an accelerometer and a memory, wherein the memory includes data representing a pre-existing energy value, includes measuring a first acceleration sample at a first time with the accelerometer based on movement of the portable computing device and measuring a second acceleration sample at a second later time with the accelerometer based on movement of the portable computing device. The absolute difference between the first and second acceleration samples is determined. The pre-existing energy value is decayed based upon the absolute difference between the first and second acceleration samples being less than a pre-determined low filter value. The absolute difference between the first and second acceleration samples is added to the pre-existing energy value based upon the absolute difference between the first and second acceleration samples being at least a pre-determined low filter value. The pre-existing energy value is set to zero and an accelerometer-based input signal is produced based upon whether the pre-existing energy value is greater than a maximum threshold value. The electronic greeting card is rendered to the portable computing device based upon the accelerometer-based input signal.

According to a further aspect of the invention, an electronic greeting card includes at least two pages and visually-perceived light effects that are updated in real-time based upon an output of an accelerometer and movement of a portable computing device that includes the accelerometer. At least one of the at least two pages can be moved and the visually-perceived light effects are dynamically updated as a result of the movement.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein.

BRIEF DESCRIPTION OF THE SEVERAL VIEWS OF THE DRAWINGS

The accompanying drawings, which are incorporated in and constitute a part of this specification, illustrate some exemplary embodiments disclosed herein, and together with the description, serve to explain principles of the exemplary embodiments disclosed herein.

DETAILED DESCRIPTION

Figure 1:
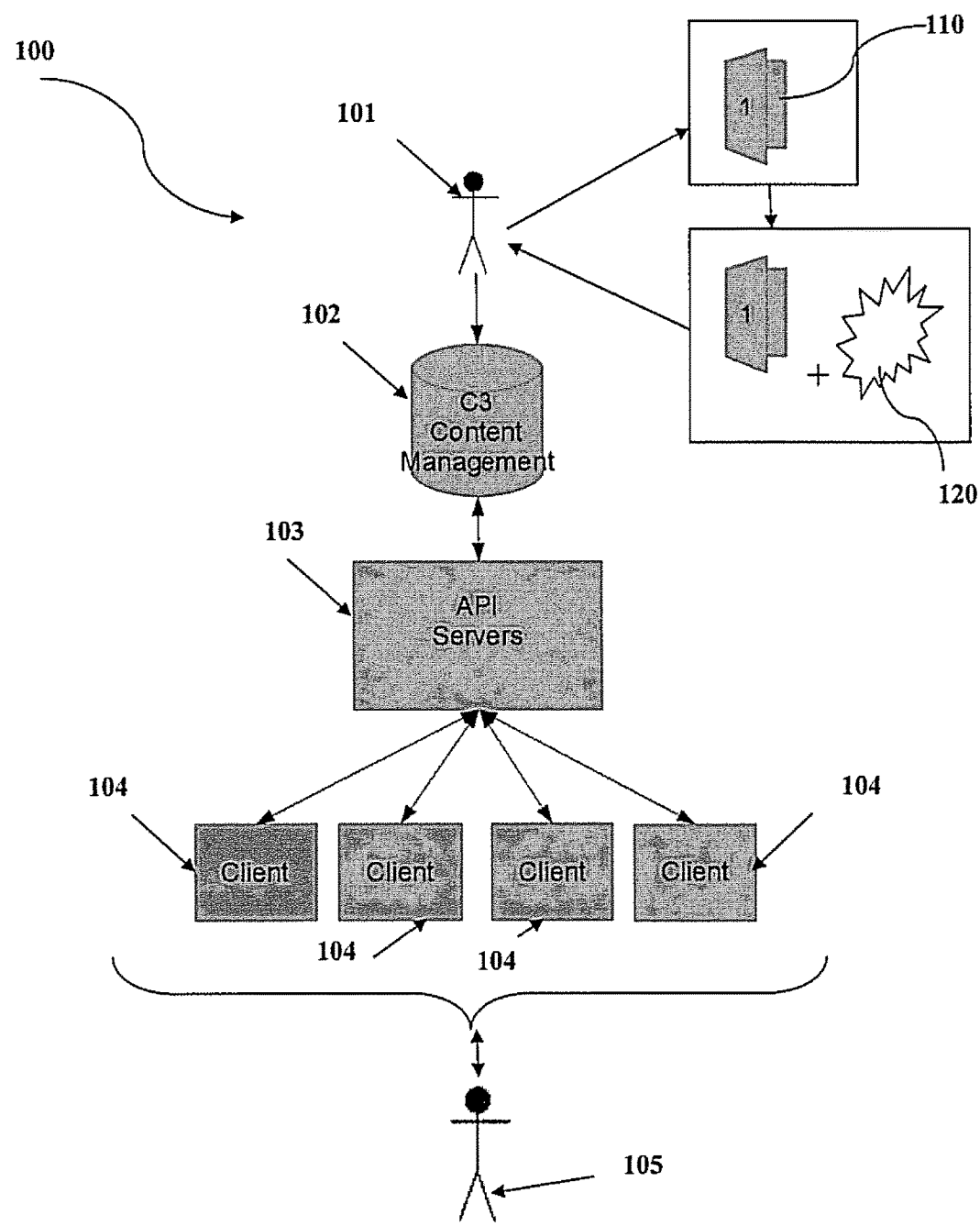
FIG. 1 represents a high level overview of the inventive system.

The exemplary embodiments disclosed herein will now be described by reference to some more detailed embodiments, with occasional reference to the accompanying drawings. These exemplary embodiments may, however, be embodied in different forms and should not be construed as limited to the embodiments set forth herein. Rather, these exemplary embodiments are provided so that this disclosure will be thorough and complete, and will fully convey the scope of the embodiments to those skilled in the art. The description of the exemplary embodiments below do not limit the terms used in the claims in any way.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. As used in the specification and the appended claims, the singular forms "a," "an," and "the" are intended to include the plural forms as well, unless the context clearly indicates otherwise.

The following are definitions of exemplary terms used throughout the disclosure. Both singular and plural forms of all terms fall within each meaning:

"Computer" or "computing device" or "processing unit" as used herein includes, but is not limited to, any programmed or programmable electronic device, microprocessor, or logic circuit that can store, retrieve, and process data.

"Portable computing devices" include, but are not limited to, computing devices that combine the powers of a conventional computer in portable environments. Exemplary portable computing devices include portable computers, tablet computers, internet tablets, Personal Digital Assistants (PDAs), ultra mobile PCs (UMPCs), carputers (typically installed in automobiles), wearable computers, and smartphones. The term "portable computing device" can be used synonymously with the terms "computer" or "computing device" or "processing unit."

"Web browser" as used herein, includes, but is not limited to, software for retrieving and presenting information resources on the World Wide Web. An information resource may be a web page, an image, a video, a sound, or any other type of electronic content.

"Software" or "computer program" as used herein includes, but is not limited to, one or more computer or machine readable and/or executable instructions that cause a computer, a portable computing device, microprocessor, logic circuit, or other electronic device to perform functions, actions, and/or behave in a desired manner. The instructions may be embodied in various forms such as routines, algorithms, modules or programs, including separate applications or code from dynamically linked libraries. Software may also be implemented in various forms such as a stand-alone program, an app, a mobile application, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile application" as used herein, includes, but is not limited to, applications that run on smart phones, tablet computers, and other mobile or portable computing devices. The terms "mobile application" or "mobile app" or "software application" or "application" or "app" can be used synonymously with "software" or "computer program" or "application software." Mobile applications allow users to connect to services that are traditionally available on the desktop or notebook platforms. Typically, these services access the Internet or intranet or cellular or wireless fidelity (Wi-Fi) networks, to access, retrieve, transmit and share data.

"Memory" as used herein is memory that is visible to and/or directly addressable by software executed on a processor.

"Processor" as used herein, refers to central processing units, microprocessors, microcontrollers, reduced instruction set circuits (RISC), application specific integrated circuits (ASIC), logic circuits, and any other circuit or processor capable of executing the functions described herein.

"Network" as used herein, includes, but is not limited to, a collection of hardware components and computers or machines interconnected by communication channels that allow sharing of resources and information, including without limitation, the worldwide web or Internet. A network maybe "wireless," "wired," or a combination of wired and wireless networks.

"Server" as used herein, includes, but is not limited to, a computer or a machine or a device on a network that manages network resources. The general term "server" may include specific types of servers, such as a Web Server, File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

"Web server" as used herein, includes, but is not limited to, a server which serves content to a web browser by loading a file from a disk, or automatically generating a response by combing a search result from a database or other repository with calculations based on client request parameters and business rules and logic embedded in the software, and serving it across a network to a user's web browser, typically using a hyper text transfer protocol (HTTP).

"Instructions" as used herein is synonymous to "Source code" or "product code", and includes, but not limited to, a textual software code, or a machine code, or notations in graphical software languages, which specify actions to be performed by a machine, which includes, but not limited to, a computer.

All publications and patent applications mentioned herein are incorporated herein by reference to disclose and describe the materials, methods and/or systems in connection with which the publications or applications are cited. It is understood that the present disclosure supercedes any disclosure of an incorporated publication to the extent there is a contradiction.

Reference will now be made to the drawings. FIG. 1 represents a high level overview of the inventive system 100. System 100 has an asset builder 101 that modifies or populates an electronic greeting card 110 with assets 120. An asset builder can be a computer software program that creates initial assets or a user of the system that creates and stores assets on system 100. Assets in general are parts of images or graphics or elements that are used to create the final image in the card, for example, a star, an animal, a flower, a pattern, etc. In the exemplary embodiment, assets 120 are, in part, components which make up "digital glitter," which is then subsequently applied to card 100 to create an electronic greeting card with digital glitter. Digital glitter as used herein includes, but is not limited to, a digital representation of physical glitter found traditionally on paper greeting cards or other goods (e.g. a party hat).

The electronic greeting card 110 may be any commercially or non-commercially available electronic greeting card. One embodiment of a customizable electronic greeting card is disclosed in U.S. patent application Ser. No. 13/460, 045, entitled "SYSTEMS, METHODS AND APPARATUSES FOR CREATING, EDITING, DISTRIBUTING, AND VIEWING ELECTRONIC GREETING CARDS," which is hereby incorporated by reference in full ("the '045 application"). The electronic greeting card disclosed in the '045 application is customizable. For instance, the electronic greeting card of the '045 application allows a user to add/edit a personalized message, a signature, and a photo to the card. For the purposes of this invention, the electronic greeting card disclosed in the '045 application will be referenced herein as the electronic greeting card 110.

Once the asset builder 101 modifies the electronic greeting card 110 with assets 120, the asset builder uploads the assets 120 to a content management system 102. The content management system 102 utilizes a scalable platform and allows the asset builder 101 to manage and edit content relating to the electronic greeting cards 110 and assets 120 dynamically and in real time. The content management system 102 is a dynamic portal engine which is built on a modular, object oriented framework allowing for component and class extensibility. The content management system 102 may be made available on a cross platform setting by utilizing known software packages such as UNIX and LINUX.

Once uploaded, the content management system 102 makes the assets 120 available to the Application Programming Interface (API) servers 103. Essentially, the API servers 103 pickup changes made in the content management system 102. Client devices 104 are computing devices such as computers, desktops, portable computing devices, laptops, tablets, smart phones, and other web enabled devices. The API servers 103 serve the card 110 (with assets 120) to a client device 104 whenever a user 105 accesses the electronic greeting card 110 on the client device 104.

The system interactions are handled via a communication network 132 (not shown), comprised of the asset builder 101, content management system 102, API servers 103, clients 104, users 105, the internet (not shown) and any host server(s) (not shown).

The goal of the system 100 would be to create digital assets 120 which could be implemented such that the assets 120 work across platforms on a variety of devices and operating systems. This includes the assets 120 running on devices 104 with dedicated graphics hardware and devices 104 that do not have hardware accelerated graphics. This also includes implementing the assets 120 on a number of graphics APIs in both 2 dimensional and 3 dimensional space. Some of the targeted platforms include, but are not limited to, Web browsers with support for the Canvas 2D drawing API (e.g. Internet Explorer, FireFox, Chrome, Safari, Opera); Adobe Flash player and integrated run times; and native applications (e.g. Windows, OS X, iOS, Android, Linux) for use on portable computing devices and/or computers.

System 100 is designed so that the assets 120 and the card 110 are visually updated at a high frame rate as the user 105 interacts with each or both of these components. This behavior simulates real world interactions of the user 105 with a (paper) greeting card. Accordingly, system 100 is configured such that the assets 120 and card 110 are accurately rendered on the client device 104 while the user 105 interacts with them in one or more of the following ways: (1) moving/rotating the card via a mouse or a touch screen; (2) changing the orientation or position of the device 104 with respect to a starting location; (3) simulating movement of a "light source"; and (4) producing the desired digital effect even without the user's 105 interaction.

U.S. patent application Ser. No. 14/104,110, entitled "SYSTEMS, METHODS, AND APPARATUSES FOR CREATING DIGITAL GLITTER," which is hereby incorporated by reference in full ("the '110 application"), discloses one or more of the above-referenced ways of user interaction. The '110 application discloses the use of assets 120 as a way to create the "digital glitter" effect described earlier. As described fully in the '110 application, the user interactions provide the user input required for the manipulation of digital assets 120 and the subsequent creation of digital glitter.

Figure 3:
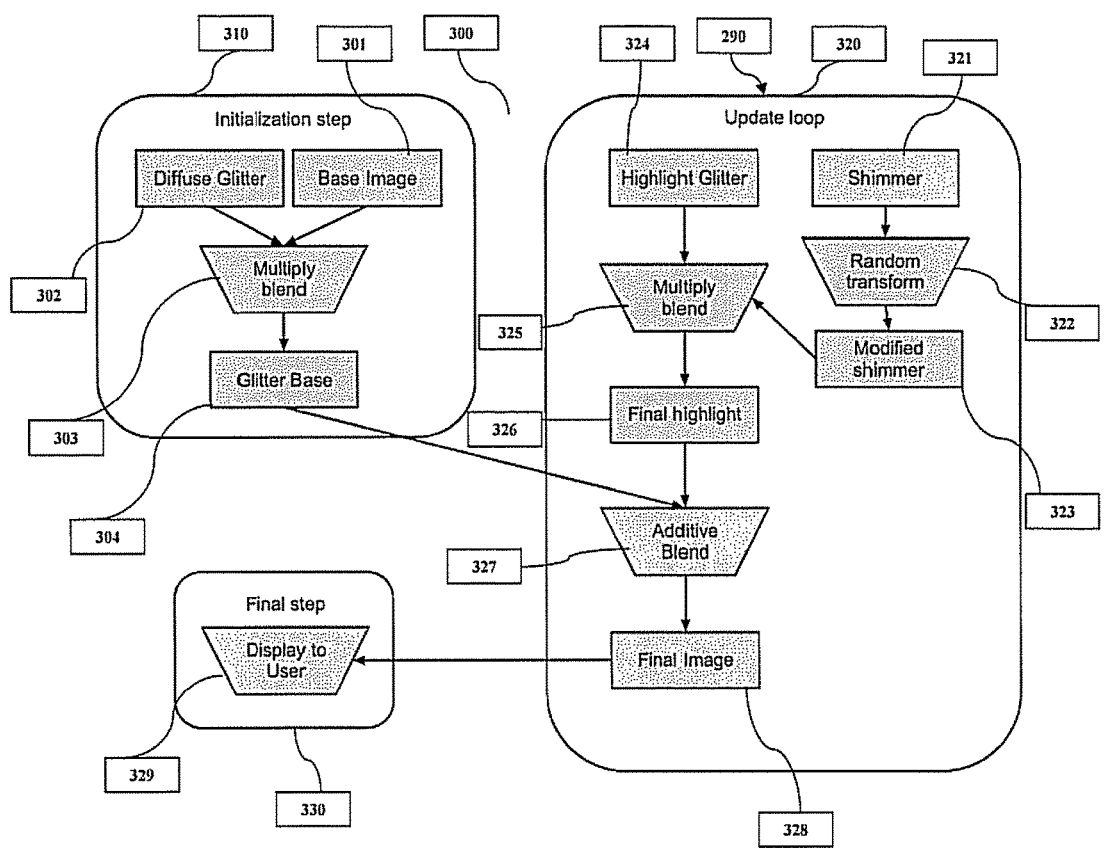
FIG. 3 shows an exemplary flowchart for generating digital glitter based on the glitter shading algorithm.

The '110 application discloses a "glitter shading" algorithm which takes the result of one or more of the above-referenced user interactions as an input signal, and thereafter, utilizing blend modes (e.g. multiply and additive blend modes) produces digital glitter on electronic greeting cards. The operation of the blend modes, which are essentially algorithms, determine how two or more images can be blended or mixed together to produce a new image. FIG. 3 shows an exemplary embodiment of the glitter shading algorithm 300, as described more fully in the '110 application.

Figure 4:
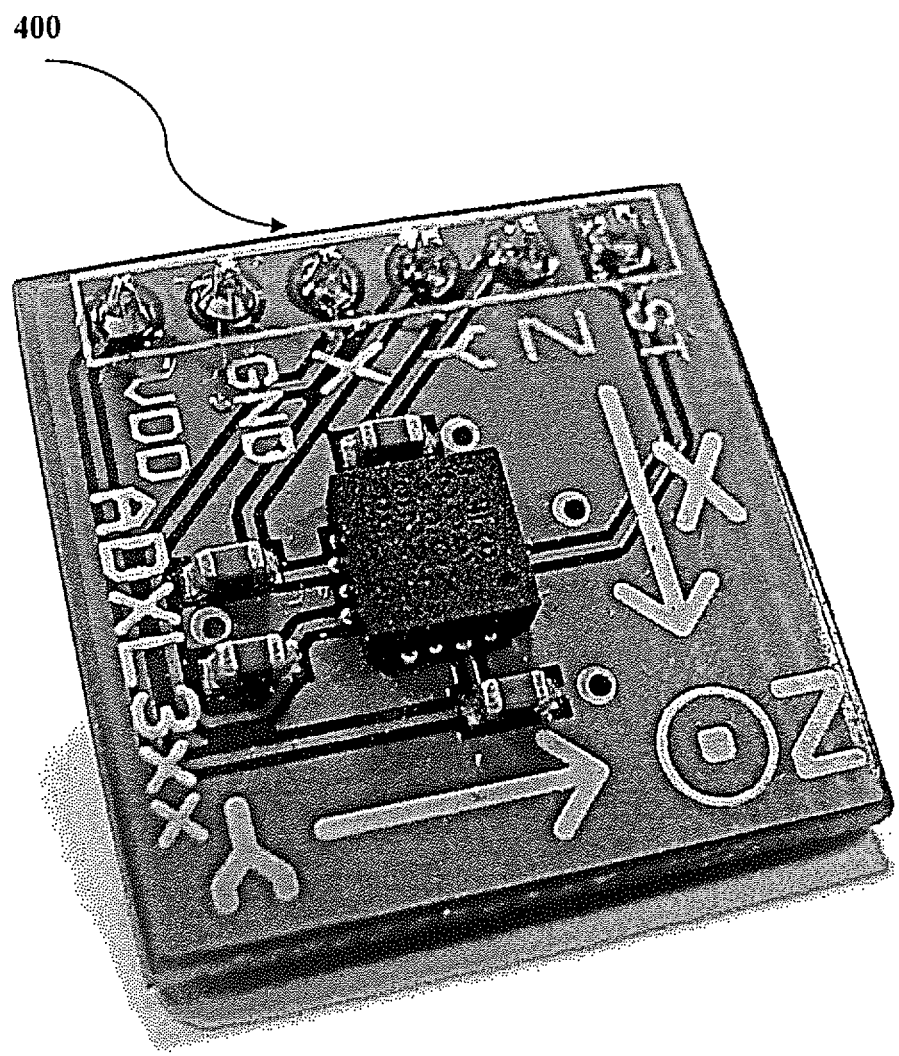
FIG. 4 shows an exemplary accelerometer in accordance with an embodiment of the present invention.

With reference to the present invention, one specific type of user interaction utilized in system 100 is the use of a motion sensing device to generate an input signal for use with the glitter shading algorithm 300. An exemplary motion sensing device, accelerometer 400, is shown in FIG. 4. Accelerometer 400 as described herein includes, but is not limited to, a known device that measures proper acceleration, which is the acceleration that the device experiences relative to freefall, and is the acceleration felt by people and objects.

Figure 5:
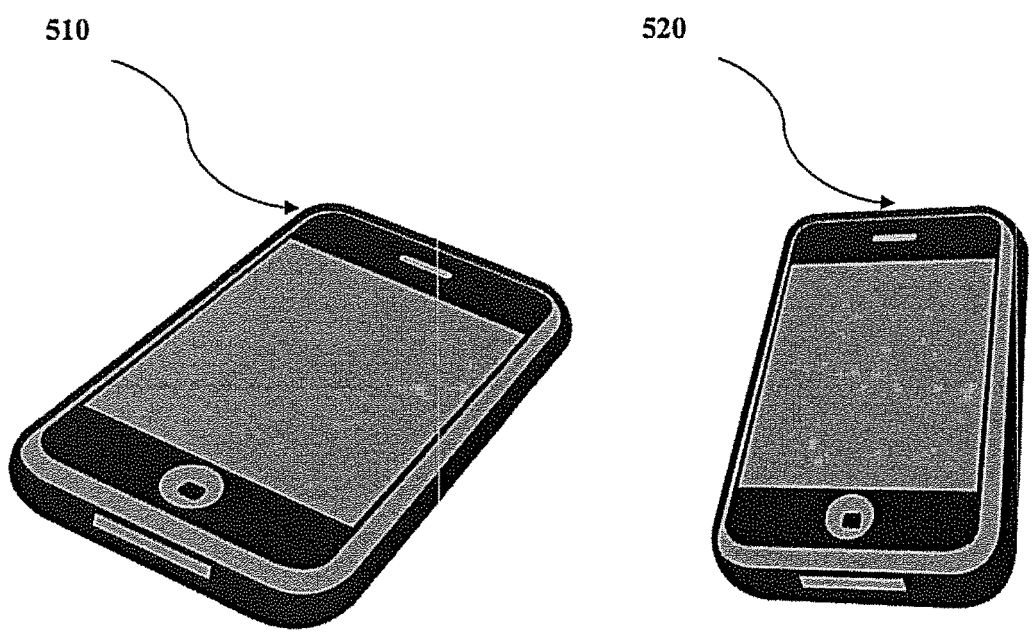
FIG. 5 shows an exemplary client device positioned at a first location and a second location in accordance with an embodiment of the present invention.

In an embodiment of the present invention, the accelerometer 400 is disposed on or in the client device 104. The client device 104 implements and renders the electronic greeting card 110 and assets 120 via system 100. As the user 105 interacts with the client device 104, by moving the client device 104 from a first location 510 (see FIG. 5) to a second location 520 (see FIG. 5), the accelerometer 400 generates an input signal 290 (see FIG. 2), via an accelerometer algorithm 200 (see FIG. 2). Signal 290 serves as the input signal necessary for activating the glitter shading algorithm 300, which then executes the several steps 310, 320, and 330 (see FIG. 3) to produce digital glitter on card 110.

In an embodiment, accelerometer 400 is configured to measure the acceleration of three different axes: X, Y, and Z on device 104. At a given location or position, X, Y, and Z axes of device 104 have default values of acceleration. When device 104 moves from the first location 510 to a second location 520, the default values for X, Y, and Z axes change correspondingly. For instance, for an accelerometer disposed on a device 104 implementing an iOS® operating system, if the first location 510 is a vertical upright position for device 104, the X axis value is 0.0, the Y axis value is −1.0, and the Z axis value is 0.0. If the second location 520 is an upside down position for device 104, the X axis value is 0.0, the Y axis value is 1.0, and the Z axis value is 0.0. While stationary, a value of 1.0 or a −1.0 or a value of approximately 1.0 or −1.0 on a certain axis (X, Y, or Z) indicates that the device 104 is experiencing the gravitational pull of the earth on that axis (X, Y, or Z). Similarly, while stationary, if the absolute sum of all values on all axes (X, Y, or Z) add up to 1.0, it indicates that the device 104 is experiencing the gravitational pull of the earth. Absolute sum as used herein includes, but is not limited to, the absolute value of the X, Y, and Z values added together. Other operating systems operate in a similar fashion as described above with reference to the iOS® operating system, but may include different units of measurement. For example, for an accelerometer disposed on a device 104 implementing an Android® operating system, gravity is measured as 9.80665 meter per second squared.

Additionally, accelerometer 400 is configured to sample the acceleration of the three different axes: X, Y, and Z ("acceleration values") at pre-determined intervals of time ("sample measurement interval"). The sample measurement interval of the acceleration values may be pre-set in the accelerometer algorithm 200 and/or may be dependent on the particular device 104 and the software being implemented on said device 104. For instance, on Android® and iOS® operating system based devices 104, the sample measurement interval may be assigned as 50 samples per second (a sample received every 20,000 microseconds). Similarly, the units of measurement of the acceleration values may be dependent on the particular device 104 and the software being implemented on said device. For instance, on an Android® operating system based device 104, the units of measurement for acceleration values may be "meter per second squared." On an iOS® operating system based device 104, the units of measurement for acceleration values may be "Standard Gravity."

In an embodiment of the invention, the accelerometer algorithm 200 takes a first and a second sample of the X, Y, and Z axes' acceleration values. The absolute difference between the second and first samples is defined as "energy." Accelerometer algorithm 200 stores some or none or all of the energy of each of the axes X, Y, and Z in three (3) different "buckets" 270, 271, and 272 respectively (not shown) (collectively "275"). The term "buckets" is used to illustrate and clarify the embodiments of the invention, and may not represent a physical or hardware-based allocation of resources by the accelerometer 400. Buckets as used herein includes, but is not limited to, an allocation of virtual resources by software disposed on the device 104, with each bucket 275 having the ability to store values in a range, the maximum of the range being a "maximum threshold value" as described below.

In order for energy to be stored in a bucket 275, it must be greater than a pre-determined value ("low filter"). The low filter value is set in order to ensure that only genuine changes in acceleration values (associated with an actual movement of the device 104, and by implication accelerometer 400) are captured by the bucket 275. "Genuine" changes as used herein are changes that do not include unintentional user interactions (e.g. a jittery hand movement) and other "noise" values (e.g. gravity). As an example, the low filter value in an embodiment is set above certain "noise" values, such as the values associated with gravity, in order to filter out the false positive values from entering the bucket 275. The low filter values may be pre-set in the accelerometer algorithm 200 and/or may be dependent on the particular device 104 and/or the software being implemented on said device. For instance, on Android® operating system based devices 104, the low filter value may be set at 0.25. On iOS® operating system based devices 104, the low filter value may be set at 0.025.

Each bucket of energy 270, 271, and 272 representing the three different axes (X, Y, and Z respectively) also has associated with it two (2) separate attributes. First, each bucket of energy 270, 271, and 272 has an associated "maximum threshold value." Maximum threshold value as used herein includes, but is not limited to, the maximum amount of energy that the bucket 275 can hold. The maximum threshold value may be pre-set in the accelerometer algorithm 200 and/or may be dependent on the particular device 104 and/or the software being implemented on said device. For instance, on Android® operating system based devices 104, the maximum threshold value may be set at 2.00. On iOS® operating system based devices 104, the maximum threshold value may be set at 0.20.

Additionally, each bucket of energy 270, 271, and 272 has an associated "decay amount value." Decay amount value as used herein includes, but is not limited to, the energy that is discarded from a bucket 275 when the bucket 275 is not actively adding energy that is above the low filter value. The decay amount value may be pre-set in the accelerometer algorithm 200 and/or may be dependent on the particular device 104 and/or the software being implemented on said device. For instance, on Android® operating system based devices 104, the decay amount value may be set at 0.05. On iOS® operating system based devices 104, the decay amount value may be set at 0.005.

Figure 2:
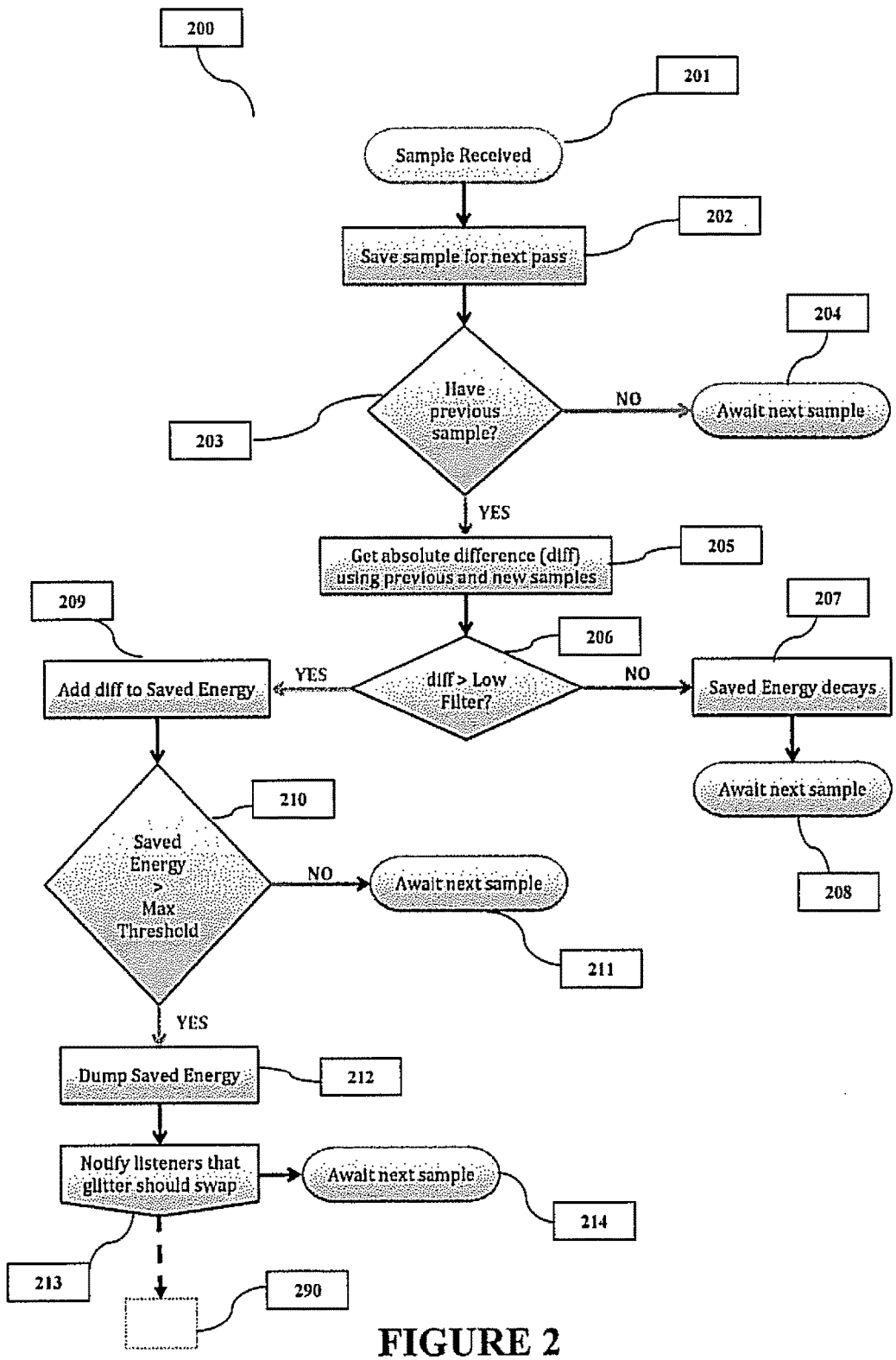
FIG. 2 is an exemplary flowchart for generating an accelerometer-based input signal for a "glitter shading" algorithm.

With reference to FIG. 2, the exemplary accelerometer algorithm 200 for generating the accelerometer-based input signal 290 for a "glitter shading" algorithm 300 is described. At step 201, an acceleration value sample 250 (not shown) is received from one of the X, Y, or Z axes of the accelerometer 400. At step 202, if sample 250 is the first sample to be received by algorithm 200, then sample 250 is saved for a follow-on sample 250". At step 203, the algorithm 200 checks to see if the current sample 250 had a predecessor sample 250'. If no previous sample 250' has been received, at step 204, the current sample 250 is saved awaiting a follow-on sample 250". At step 203, if it is determined that a previous sample 250' has been received, the process moves to step 205. At step 205, the algorithm 200 determines the absolute difference of values between samples 250 and 250' ("energy"). The process then moves to step 206, where the algorithm 200 checks to determine if the energy is greater than a pre-determined low filter value (as described earlier). If at step 206, it is determined that the energy is greater than the low filter value, the process moves to step 209. At step 209, the energy is added to pre-existing energy (procured from processing previous acceleration value samples) and stored in a bucket 275. The energy and the pre-existing energy together are defined as "saved energy". At step 210, the saved energy value is compared to a maximum threshold value (as described above). If at step 210, it is determined that the saved energy value is lower than the maximum threshold value, the process moves to step 211 where it awaits the next sample 250". If at step 210, it is determined that the saved energy value is greater than the maximum threshold value, the process moves to step 212 where the total saved energy value accumulated thus far in the process is discarded. Additionally, the process moves to step 213, where listeners 260 (not shown) that are in operative communication with the glitter shading algorithm 300 are notified via an input signal 290 that the glitter shading algorithm's 300 input loop must activate and render digital glitter. Further, after notifying the listeners 260, the algorithm 200 moves to step 214 where it awaits the next sample 250". If at step 206, it is determined that the energy is not greater than the low filter value, the process moves to step 207 where the pre-existing energy is decayed, per the decay amount value described above. The process then moves to step 208 where it awaits the next sample 250". This process occurs simultaneously for the other two axes (X, Y, or Z) resulting in the generation of corresponding input signals 290 for each of the remaining two axes.

Therefore, accelerometer values sampled from each of the three axes (X, Y, or Z) 250 may be used to trigger the accelerometer algorithm 200 and subsequently generate the accelerometer-based input signal 290. The accelerometer-based input signal 290 is then received as an input by the "glitter shading" algorithm 300 to subsequently render digital glitter (see FIG. 3, and input signal 290 with respect to FIG. 3).

The algorithms of the present invention may be implemented in several programming languages. For example, in iOS native applications, the algorithms may be implemented in Objective C language. Similarly, in Android native applications, the algorithms may be implemented in Java language.

The above description of specific embodiments has been given by way of example. From the disclosure given, those skilled in the art will not only understand the general inventive concepts and attendant advantages, but will also find apparent various changes and modifications to the structures and methods disclosed. For example, although the embodiments disclose an accelerometer generally, the general inventive concepts could be readily extended to any processor capable of executing the functions described herein. Similarly, although the embodiments disclose the use of input signal 290 by algorithm 300 (digital glitter algorithm), the general inventive concepts could be readily extended such that input signal 290 may also be used by other algorithms not described herein to perform other actions on the device 104 or in the system 100. It is sought, therefore, to cover all such changes and modifications as fall within the spirit and scope of the general inventive concepts, as described and claimed herein, and equivalents thereof. The descriptions of the exemplary embodiments do not limit the invention or terms of any future claims in any way, which claims will have all of their full, ordinary meaning.

The invention claimed is:

1. A system for rendering an electronic greeting card comprising:
    a portable computing device having a memory, wherein the memory includes data representing a pre-existing energy value;
    an accelerometer that generates an output related to movement of the portable computing device;
    wherein the pre-existing energy value is based upon a difference between an output of the accelerometer at a first time and an output of the accelerometer at a second, later time;
    wherein an algorithm updates visually-perceived light effects of the electronic greeting card in real time based on the pre-existing energy value and a subsequent accelerometer output at a third time; and
    wherein the electronic greeting card is dynamically rendered to the portable computing device by
        blending a base image with a diffused light texture to produce a diffused base image,
        blending a shimmer texture with a highlighted texture to produce a final highlight texture,
        blending the final highlight texture with the diffused base image to produce the image of the electronic greeting card, and
        rendering the electronic greeting card on the portable computing device.

2. The system of claim 1 wherein the value of the pre-existing energy value decays based upon a preset decay value and based upon the absolute difference between two outputs of the accelerometer being less than a pre-determined low filter value.

3. The system of claim 1 wherein the electronic greeting card is two-dimensional.

4. The system of claim 1 wherein the electronic greeting card is three-dimensional.

5. The system of claim 1 wherein the algorithm dynamically renders the electronic greeting card based on physical interaction with the greeting card.

6. The system of claim 1 wherein the electronic greeting card has at least two pages.

7. The system of claim 6 wherein the algorithm dynamically renders the electronic greeting as a page is moved.

8. The system of claim 1 wherein the algorithm comprises an additive blend mode.

9. The system of claim 1 wherein the algorithm comprises a multiply blend mode.

10. The system of claim 1 wherein the algorithm comprises a random translation of an image highlight.

11. The system of claim 1, wherein a location of the shimmer texture is constantly updated in real time by a random translation of pixels.

12. A method for rendering an electronic greeting card to a portable computing device having an accelerometer and a memory, the method comprising:
    measuring a first acceleration sample at a first time with the accelerometer based on movement of the portable computing device;
    measuring a second acceleration sample at a second later time with the accelerometer based on movement of the portable computing device;
    determining the absolute difference between the first and second acceleration samples and storing the absolute difference in the memory as a pre-existing energy value;
    decaying the pre-existing energy value based upon a preset decay value and based upon the absolute difference between the first and second acceleration samples being less than a pre-determined low filter value;
    measuring a third acceleration sample at a third later time with the accelerometer based on movement of the portable computing device;
    adding a value based on the absolute difference between the second and third acceleration samples to the pre-existing energy value based upon the absolute difference between the second and third acceleration samples being at least a pre-determined low filter value;
    setting the pre-existing energy value to zero and producing an accelerometer-based input signal based upon whether the pre-existing energy value is greater than a maximum threshold value; and
    rendering the electronic greeting card to the portable computing device based upon the accelerometer-based input signal by
        blending a base image with a diffused light texture to produce a diffused base image, blending a shimmer texture with a highlighted texture to produce a final highlight texture, blending the final highlight texture with the diffused base image to produce the image of the electronic greeting card, and rendering the electronic greeting card on the portable computing device.

13. The method of claim 12 wherein a location of the shimmer texture is constantly updated in real time by a random translation of pixels.

* * * * *